United States Patent [19]

Spragg et al.

[11] Patent Number: 5,769,980
[45] Date of Patent: Jun. 23, 1998

[54] PNEUMATIC TIRE WITH SIDEWALL INSERTS HAVING SPECIFIED EXTENSION UNDERNEATH THE BELT PACKAGE

[75] Inventors: Charles D. Spragg, Hudson; Thomas W. Bell, Mogadore; William L. Hergenrother; James M. Kirby, both of Akron, all of Ohio

[73] Assignee: Bridgestone/Firestone, Inc., Akron, Ohio

[21] Appl. No.: 748,263

[22] Filed: Nov. 13, 1996

[51] Int. Cl.$^6$ .......................... B60C 15/00; B60C 15/06; B60C 17/00

[52] U.S. Cl. .......................... 152/517; 152/546; 152/554; 152/555

[58] Field of Search ................... 152/517, 546, 152/555, 554

[56] References Cited

U.S. PATENT DOCUMENTS

| | | | |
|---|---|---|---|
| 4,261,405 | 4/1981 | Yamauchi et al. | 152/517 X |
| 4,405,007 | 9/1983 | Welter | 152/517 X |
| 5,217,549 | 6/1993 | Johnson | 152/517 |
| 5,368,082 | 11/1994 | Oase et al. | 152/517 |
| 5,464,899 | 11/1995 | Freeman et al. | 152/517 X |
| 5,494,091 | 2/1996 | Freeman et al. | 152/517 |
| 5,494,958 | 2/1996 | Freeman et al. | 152/517 X |
| 5,511,599 | 4/1996 | Willard, Jr. | 152/517 X |

FOREIGN PATENT DOCUMENTS

| | | | |
|---|---|---|---|
| 0 385 192 | 9/1990 | European Pat. Off. | 152/517 |
| 2 469 297 | 5/1981 | France | 152/517 |
| 2 138 367 | 10/1984 | United Kingdom | 152/517 |

*Primary Examiner*—Adrienne C. Johnstone
*Attorney, Agent, or Firm*—Carmen S. Santa Maria

[57] ABSTRACT

A pneumatic passenger tire has an aspect ratio of greater than 50%, having bead portions with a height of not less than 30% of the tire section height, but no greater than the height of the maximum section width of the tire, and a pair of crescent-shaped sidewall inserts on either side of the belt package, disposed axially inward of the carcass structure, wherein the sidewall insert has a first inner end located at a position between 15% and 45% of height H of the bead portions, and a second outer end which extends to an axial position of not less than 40% of a half width of the outermost belt, as measured from the lateral edge of the belt toward an equatorial plane EP of the tire. The tire construction has sidewall insert is comprised of a sulfur-vulcanizable rubber compound having high compressive flex fatigue, high modulus and low hysterisis subsequent to vulcanization.

21 Claims, 4 Drawing Sheets

PNEUMATIC TIRE WITH SIDEWALL INSERTS HAVING SPECIFIED EXTENSION UNDERNEATH THE BELT PACKAGE

BACKGROUND OF THE INVENTION

1. Technical Field

This invention relates to pneumatic tires and, particularly to a pneumatic passenger tire, which enables run-flat travel. Such pneumatic passenger tires have an aspect ratio of greater than 50% (where the aspect ratio is defined as a ratio of height to the maximum width of a tire).

2. Related Art Information

Various tire constructions have been devised over the years which enable a tire to run in an underinflated or non-inflated condition, such as after being punctured and losing air pressure, for extended periods of time and at relatively high speeds, thus enabling safe vehicle operation to an appropriate location for repair or replacement of the punctured tire. Several of these run-flat tires have been successful for certain applications and embody various types of tire constructions. Many such run-flat tires achieve their run-flat properties by placing reinforcing layers or members of relatively stiff elastomeric material in the sidewall areas of the tire, where they enable the tire to support the vehicle weight even with the complete loss of internal air pressure.

Examples of various prior art run-flat tire constructions are set forth in the following patents:

U.S. Pat. No. 5,217,549 discloses a pneumatic safety tire which has a pair of crescent shaped elastomeric reinforcing members located between the inner liner and side wall and extending from adjacent the tread shoulders to at least the apex of the bead fillers of the tire. Further, a pair of bias reinforcing plies are located between the elastomeric reinforcing members and the side walls of the tire and extend along the side walls from adjacent the tread shoulders to below the top most turn-up ends of the body ply.

U.S. Pat. No. 5,309,970 discloses a pneumatic safety tire which has a pair of bead fillers and a pair of rubber reinforcement layers each comprised of two reinforcing rubber layers arranged such that the first reinforcing layer is radially outward and the second reinforcing layer is radially inward of the tire axis. Shore A hardness is arranged such that the first reinforcing rubber layer is softer than the second reinforcing layer, while the bead filler is made of the hardest material.

U.S. Pat. No. 5,368,082 discloses a radial ply pneumatic tire which has a carcass with a bead portion, a carcass reinforcing structure and a bead filler. The carcass reinforcing structure has two plies with turn-up ends wrapped about each bead. The tire carcass includes elastomeric first and second fillers, the first filler being located between the first ply and the inner liner of the tire, and the second filler being located between the first and second ply.

U.S. Pat. No. 5,427,166 discloses a run-flat tire which includes a pair of thickened sidewall portions, a belt package with a cap ply, lower sidewall rubber support portions, a specially designed bead seat area with a rim seat ply and three carcass layers. Each side wall portion has first and second crescent shaped reinforcing members disposed outside an inner liner portion.

U.S. Pat. No. 5,511,599 discloses another run-flat tire which includes three crescent shaped reinforcing members disposed outside an inner liner portion.

Although many of these run-flat tire constructions set forth in the above-referenced patents have proven to be successful for certain applications, these constructions usually are found in low profile tires, that is, applications in which the tires have an aspect ratio of not more than 50%. These tires are of the type usually found on high performance vehicles. If these constructions are applied to high profile tires, that is tires having an aspect ratio of greater than 50%, the tires do not have both sufficient uninflated durability and good subjective ride performance in the inflated condition. In such a case, as in U.S. Pat. Nos. 5,217,549 and 5,309,970 wherein the inner or lower end of the elastomeric reinforcing member overlap the upper portion of the filler and the outer or upper end is positioned below the belt end, early or premature tire failures frequently can be traced to anomalies in insufficient overlap of the crescent shaped reinforcing member. The failure usually initiates in the elastomeric reinforcing member below the belt end. In a construction in which bias reinforcing strips are placed in the sidewall, as in U.S. Pat. No. 5,217,549, the reinforcing strip material must be placed flat on the tire building drum during first stage construction, and then turned up after the beads have been set. This complicates the conventional tire building process and makes tire building difficult because of the elastomeric sidewall member. Further, although the uninflated durability of the tire may be increased by using a plurality of sidewall reinforcing strips, the inflated ride quality is adversely affected. In such cases in which tires have two or three crescent shaped reinforcing members, as in U.S. Pat. Nos. 5,368,082, 5,417,166 and 5,511,599, the conventional tire building process is complicated and tire building is difficult.

The requirement that a run-flat tire be both durable, for a safe ride, and have good subjective ride performance are apparently conflicting. However, recently issued U.S. Pat. Nos. 5,464,899, 5,494,091 and 5,494,958 disclose sulfur-vulcanizable rubber compounds which are devoid of peroxide components. These compounds, which have high modulus and low hysterisis properties, hold great promise for solving the conflicting requirements for durability and good subjective ride performance in high profile tires capable of running in underinflated or non-inflated condition. However, these compounds have not been utilized in constructions of high profile run-flat tires, but may be used to produce an improved crescent-shaped reinforcing member which can solve this apparent conflict.

SUMMARY OF THE INVENTION

An object of the invention is to provide a high profile pneumatic tire which has improved handling and performance characteristics in both inflated and uninflated conditions, while providing durability of up to 50 miles after a complete loss of air pressure event, depending upon speed, load and ambient temperature.

A pneumatic tire having an aspect ratio of greater than 50% according to this invention, is characterized by including a tread portion having a pair of lateral edges; a belt package located radially inward of the tread portion; a pair of bead portions, each having a bead core and a bead filler positioned radially outward of the bead core, wherein the height H of the bead portion from a nominal rim diameter is not less than 30% of the tire section height SH and preferably is no greater than a height MH from the nominal rim diameter at the maximum section width WM; a carcass structure having at least one carcass ply extending between each bead core and turned up around each bead core in the axially outward direction; a pair of sidewalls each extending radially from the tread edge of the tread portion to the bead portion and having a single crescent shaped sidewall insert disposed axially inward of the carcass structure, wherein the sidewall insert has a first inner or lower end located at a position between 15% to 45% of the height H of the bead portion height H, and overlaps the bead filler, the insert having a second outer or upper end which extends to an axial position of not less than 40% of a half width B/2 of the outermost belt and terminating before reaching the equatorial plane EP of the tire when B/2 is measured from the lateral edge of the outermost belt to the equatorial plane EP. It will be recognized by those familiar with the art that the bead base is a plane located between the plane containing the nominal rim diameter and the plane containing the maximum section width.

In this invention, it is preferable that the thickness or gauge G of the insert below the lateral edge of the outermost belt is from 5 mm to 20 mm, and preferably from 6 mm to 13 mm. Further, it is preferable that a turn-up portion of at least one of the carcass plies extend around the bead filler and ends above the upper end of the bead filler. When the carcass structure consists of two carcass plies, the turn-up portion 152 of the outer ply 150 ends above the upper end of the bead filler, and the turn-up portion 142 of the inner ply 140 ends above the turn-up end of the outer ply.

Other features and advantages of the present invention will become apparent from the following more detailed description of the preferred embodiment, taken in conjunction with the accompanying drawings, which will illustrate, by way of example, the principles of the invention.

BRIEF DESCRIPTION OF THE DRAWINGS

For a better understanding of the invention, reference is made to the attached drawings, wherein.

DETAILED DESCRIPTION OF THE INVENTION

Figure 1:
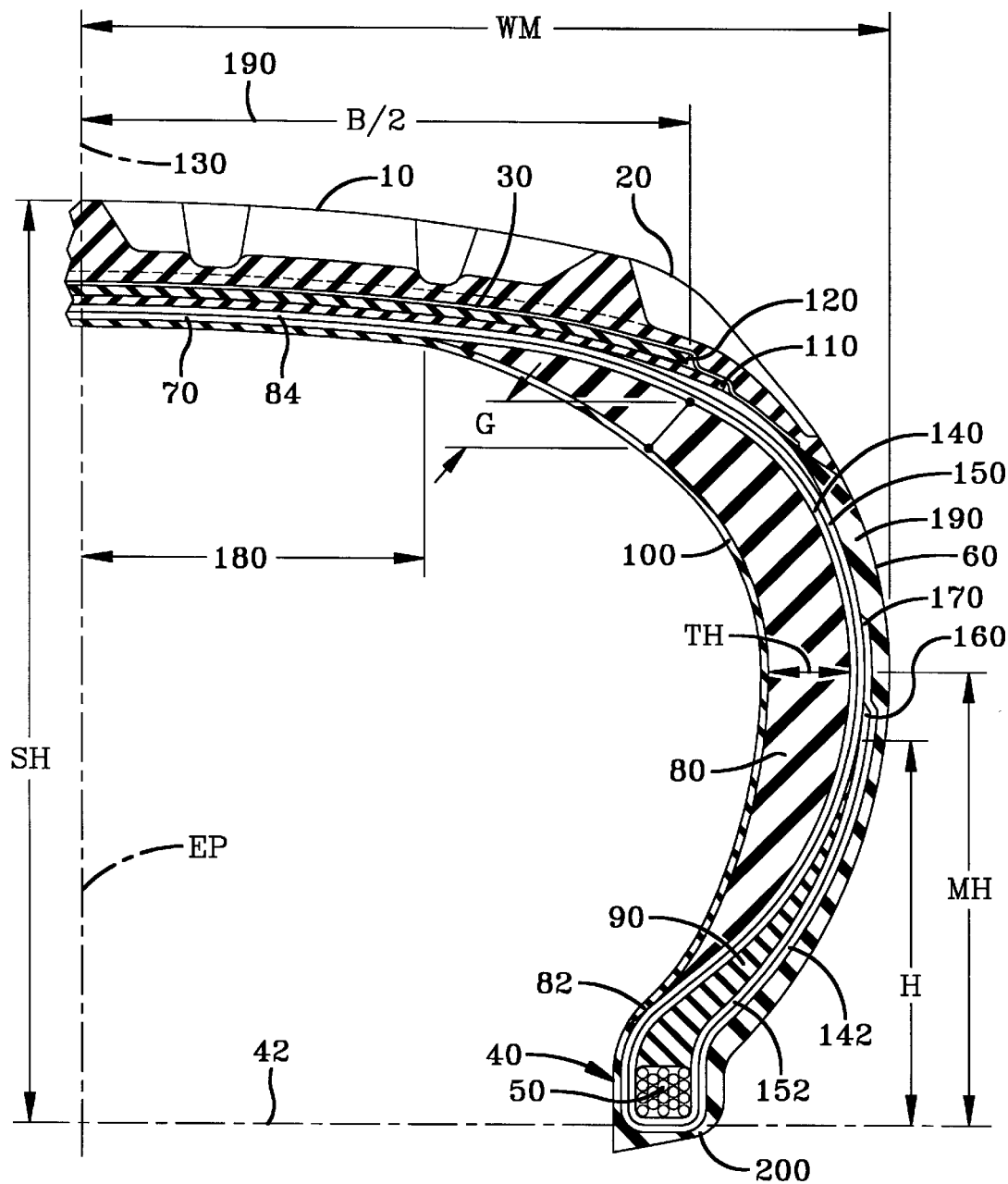
FIG. 1 is a sectional view of the pneumatic tire of the present invention.

Referring to Fig. 1, a pneumatic tire 1 according to this invention includes a tread portion 10 having a pair of lateral edges 20, a pair of bead portions 40, each bead portion comprised of a bead core 50 and bead filler 90, a carcass structure 70, and a pair of sidewalls 60.

The carcass structure 70 comprises at least one radial carcass ply, and in FIG. 1, the carcass structure is comprised of an inner ply 140 and an outer ply 150, each extending between the bead cores 50, through the sidewall portions and the tread portion and turned up around the bead core 50 to form turn-up portions 142, 152. The carcass ply is comprised of organic fiber cords, such as polyester cords or rayon cords and arranged at an angle in a 10° range of 85° to 95° (+85° to −85°) with respect to the equatorial plane EP of the tire.

Figure 3:
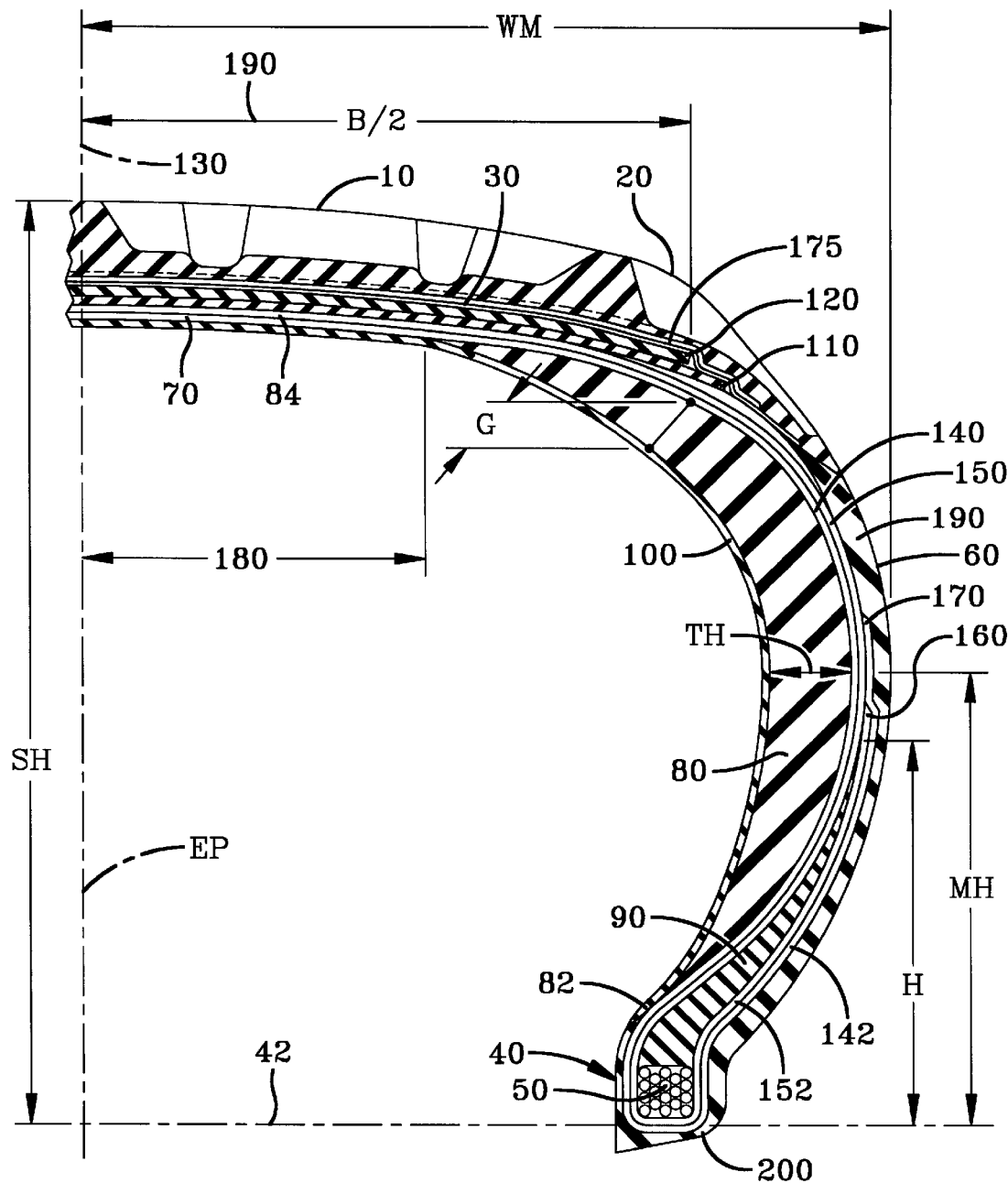
FIG. 3 is a sectional view of the pneumatic tire of the present invention including a cap ply.
Figure 4:
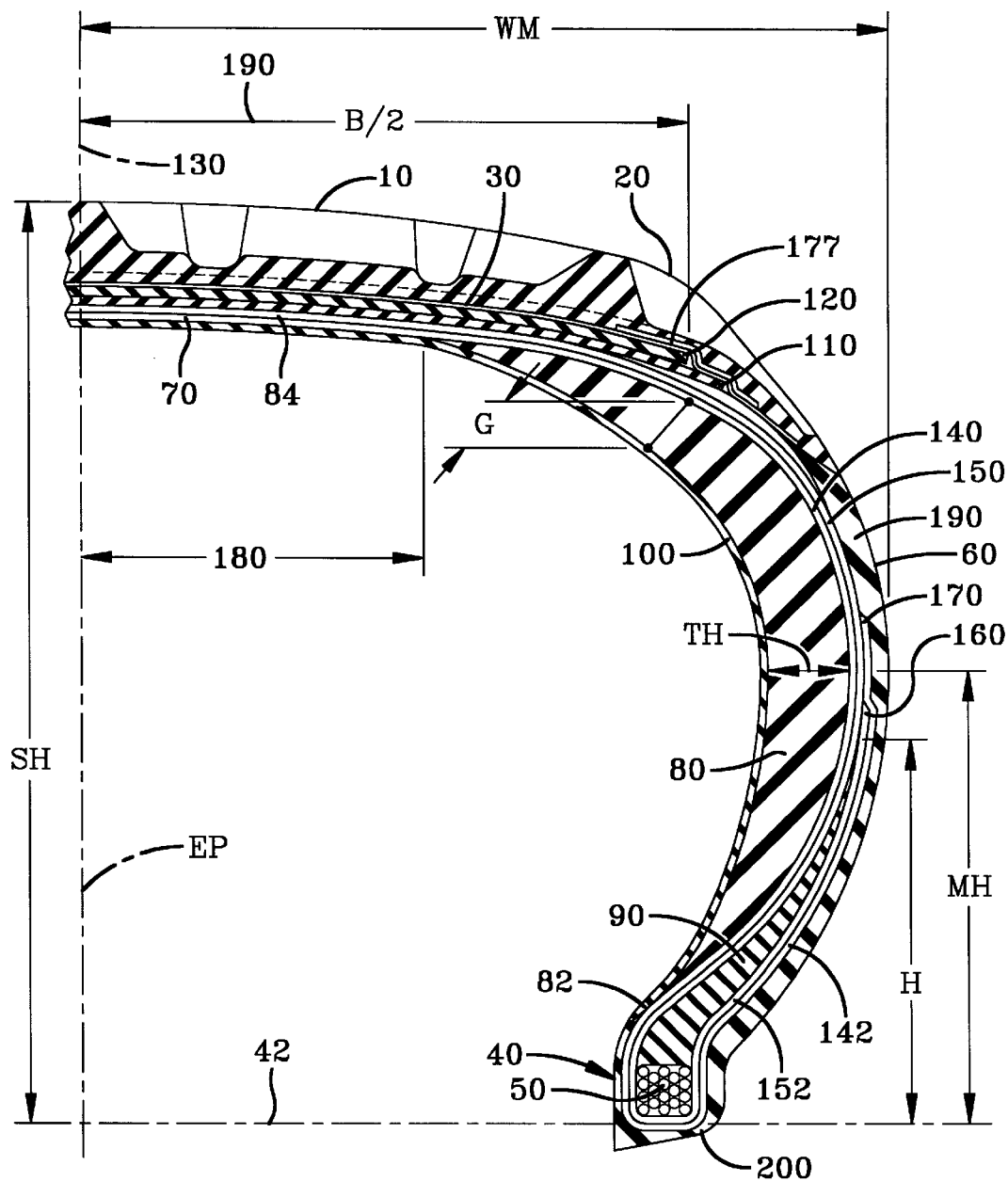
FIG. 4 is a sectional view of the pneumatic tire of the present invention including a cap strip.

The tread portion 10 has a tread width in which the tire contacts the road. The tread portion 10 is reinforced with a belt package 30 comprising at least two belts, see FIG. 1, arranged symmetrically with respect to the equatorial plane EP of the tire such that the lateral edge 110 of the inner belt extends beyond the lateral edge 120 of the outer belt. Each belt comprises inextensible cords such as steel cords, the cords in each ply being inclined with respect to one another such that the cords in one ply are crossed at an angle with those in an adjacent ply. The angle of the cord is in a range of 18° to 30° with respect to the equatorial plane EP. In FIG. 1, no additional belt layers are depicted. However, a fabric reinforced cap ply 175 skimmed with a thin layer of rubber as depicted in FIG. 3 may optionally be used. Further, a fabric reinforcing cap strip 177 as shown in FIG. 4 may be used alone or in combination with the cap ply 175.

In the bead portion 40, a bead filler 90 is arranged radially outwardly from the bead core 50 between the main bodies of the carcass ply 140, 150 and their turn-up portions 142, 152. The filler 90 exhibits a substantially triangular cross sectional shape so that the bead portion has a height H of not less than 30% of the tire section height SH measured from the nominal rim diameter at the equatorial plane EP of the tire to the outer portion of the tread, preferably from 35% to 45%, and more preferably has a height H not less than 35%, or about 37% of the tire section height SH. If the height is less than 30%, the tire can not sufficiently support load after a loss of air pressure event, and durability is degraded.

It is preferable that a turn-up portion of at least one of the carcass plies ends above the upper end of bead filler 90. In FIG. 1, both turn-up ends 160, 170 of the carcass plies 140, 150 extend above the upper end of bead filler 90, that is, two carcass plies 140, 150 completely encompass filler 90, thereby providing enhanced durability. The turn-up end 160 of outer ply 150 ends just below the maximum section width WM point of the tire, and the turn-up portion 170 of the inner ply 140 extends over turn-up end 160 of outer ply 150 and ends above the maximum section width WM point of the tire.

Sidewall 60 is reinforced with a crescent shaped sidewall insert 80 disposed between the inner carcass ply 140 and an inner liner 100. The sidewall insert 80 is placed axially inward of the carcass and is not reinforced with other additional cord strips or plies. Therefore, the building process is less difficult in comparison with tires wherein a reinforcing strip is used or plural sidewall inserts are placed between carcass plies and between inner carcass ply and inner liner, because placing the reinforcing strip in the sidewall requires the material to be placed flat on the tire building drum during the first stage building process, and then requires shaping after the beads have been set. Further, the reinforcing strips with bias angle cords, for example up to 45°, limit shear forces in the sidewall and increase the spring rate of the tire. Although the uninflated durability of the tire may increase by using such reinforcing strips, the inflated ride quality will be adversely affected. The present invention achieves both inflated ride quality and uninflated durability by the single sidewall insert. The sidewall insert 80 may be comprised of a single rubber layer or a plurality of different rubber layers, such as set forth in U.S. Pat. No. 5,309,970 assigned to Bridgestone Corporation.

The inner end 82 of sidewall insert 80 overlaps bead filler 90 in a manner such that inner end 82 is between 15% to 45%, preferably 30% to 40% of the bead portion height H as measured from the normal rim diameter 42. This positioning of the side wall insert provides improved run-flat durability. If the insert overlap is insufficient, premature durability failures in this region can be traced to the overlap of the crescent shaped sidewall insert 80 with bead filler 90. The outer end 84 of the sidewall insert extends underneath the belt package 30 to an axial position of not less than 40%, preferably not less than 45%, of a half width B/2 of the outermost belt 120 from the lateral edge thereof. We have found, by uninflated durability testing, that conventional run-flat tires usually have failures which initiate in a sidewall insert in the vicinity of the belt edge 120, after low mileage (less than 30 miles). Thus, it is crucial to have sufficient insert gauge below the belt edge, which is preferably 6 mm to 13 mm. The insert, as noted is crescent shaped, with the gage of the insert at TH located in the vicinity of the height MH being about 115% to 125% of the gage G of the insert below the lateral edge. Thus, if the gage G of the insert which is the diameter of an imaginary circle tangent to inner ply 140 below the lateral edge 120 is about 8.0 to 10.2 mm, and preferably about 9.5 mm, then the gage of the insert at TH is about 9.2–12.8 mm, and preferably about 11–12 mm. Tires made in accordance with the present invention will run conservatively for distances in excess of 30 miles before failure by this mode.

The inner liner 100 is made of any ordinary rubber such as halogenated butyl rubber.

The axial outer side of the sidewall 60 is entirely covered with an outer cover rubber 190 having excellent bending resistance, and the outer side of the bead portion 40 is covered with rubber a chafer 200 having excellent wear resistance.

In this invention, the uncured rubber composition from which crescent shape sidewall insert 80 is formed preferably has a high modulus, a low hysteresis, and a durometer Shore A hardness within a specified range. Such a sulfur-vulcanizable rubber composition is disclosed in U.S. Pat. Nos. 5,494,958, 5,494,091 and 5,464,899. These patents are incorporated herein by reference into this application. One of the compositions preferably used as the insert for the tires of the present invention comprises about from about 25 to 75 parts by weight of a rubbery polymer selected from the group consisting of natural rubber and diene (co)polymers and from about 25 to 75 parts by weight, of a graft copolymer comprising an unsaturated polymer backbone selected from the group consisting of polyisoprene, diene (co)polymers and EPDM, having pendently grafted thereto a polymerized metal salt of an unsaturated carboxylic acid. The total combined weight of the rubbery polymer and the graft copolymer is 100 parts by weight. The remainder of the uncured rubber composition is, by weight, about 50 to 100 parts of conventional rubber additives per 100 parts by combined weight of the rubbery polymer and the graft copolymer. In a preferred embodiment, the graft copolymer is comprised of from about 60–80% by weight of at least one polymer selected from the group consisting of polyisoprene and diene (co)polymer and from about 20–40% by weight of polymeric metal salt of $\alpha,\beta$-ethylenically unsaturated carboxylic acid. This preferred rubber compound also includes as one of the conventional rubber additives about 50 to 70 parts by weight of a reinforcing filler per 100 parts by combined weight of rubbery polymer and graft copolymer and at least about 4 parts by weight of a curative selected from the group consisting of sulfur and sulfur donors per 100 parts by combined weight of rubbery polymer and graft copolymer. The sulfur-vulcanizable compound is also devoid of peroxide components. In the preferred embodiment, the polymeric metal salt is poly-zinc dimethyacrylate and the reinforcing filler is carbon black. Further, this rubber compound is also characterized by high compressive flex fatigue, high modulus and low hysterisis, is capable of being worked prior to vulcanization, and has a high modulus, low hysterisis properties subsequent to vulcanization.

Regarding physical properties of the rubber compounds, a normalized, mechanical static modulus of the sulfur-vulcanizable rubber compound is in a range from about 1400 psi to 4000 psi at 15% strain subsequent to vulcanization, preferably in a rage between about 2600 psi and 2800 psi. The hardness range should be within from about 72 and to 97 on Shore A hardness scale, at 23° C., preferably in a range between about 72 and 90. The hysterisis when measured at 100° C. at 10 Hz and 7 percent deflection has a tangent Delta (tan $\delta$) of from about 0.03 to 0.20, preferably between 0.03 and 0.11.

As noted above, the uncured grafted rubber copolymer preferably comprises from about 60 to 80 percent by weight of at least one said polyisoprene and said diene polymer, and from about 20 to 40 parts by weight of said polymeric metal salt of said $\alpha,\beta$-ethylenically unsaturated carboxylic acid. The metal salt of the a,b-ethylenically unsaturated carboxylic acid is preferably poly zinc dimethacrylate. One of the conventional rubber additives is a reinforcing filler, which preferably is carbon black.

The bead filler 90 can be made of the above mentioned compound. In this case, heat generated during uninflated running is restrained because of its low hysterisis property and this construction provides further improved run-flat durability, and also inflated ride characteristics are improved.

The construction and effect of the pneumatic tire of the invention will be further explained with reference to the following test example.

EXAMPLE

The construction shown in FIG. 1 was employed in a pneumatic tire with a tire size of P225/60R16, and this tire was subject to evaluation of durability and riding comfort.

Two plies comprised of polyester cords were arranged at 90° with respect to the equatorial plane EP and were used as a carcass structure 70, and two belts comprised of steel cord were arranged at 68° with respect to the equatorial plane and were used as a belt package 30 in which the cords in one ply were crossed with respect to those in the other ply.

The bead filler had a height H of 37% of the tire section height SH. The crescent-shaped sidewall insert 80 had an inner end 82 set at 35% of a bead filler height H and an outer end 84 set at an axial position of 46% of a half width B/2 of the outermost belt from the lateral edge thereof. The gauge G of the sidewall insert below the end of the outermost belt 120 was 9.5 mm.

The compound of the sidewall insert and the bead filler is made of the same sulfur-vulcanizable rubber compound having a high modulus and a low hysteresis. (The blend formulation of this sulfur-vulcanizable rubber is shown in Table 1.) Regarding physical properties of the rubber compounds of this invention, a normalized, mechanical static modulus of the sulfur-vulcanizable rubber compound is 2400 psi at 15% strain subsequent to vulcanization, the hardness range is 81 on the Shore A hardness scale at 23° C., and the tan d when measured at 100° C. at 10 Hz and 7 percent deflection is 0.074.

Figure 2:
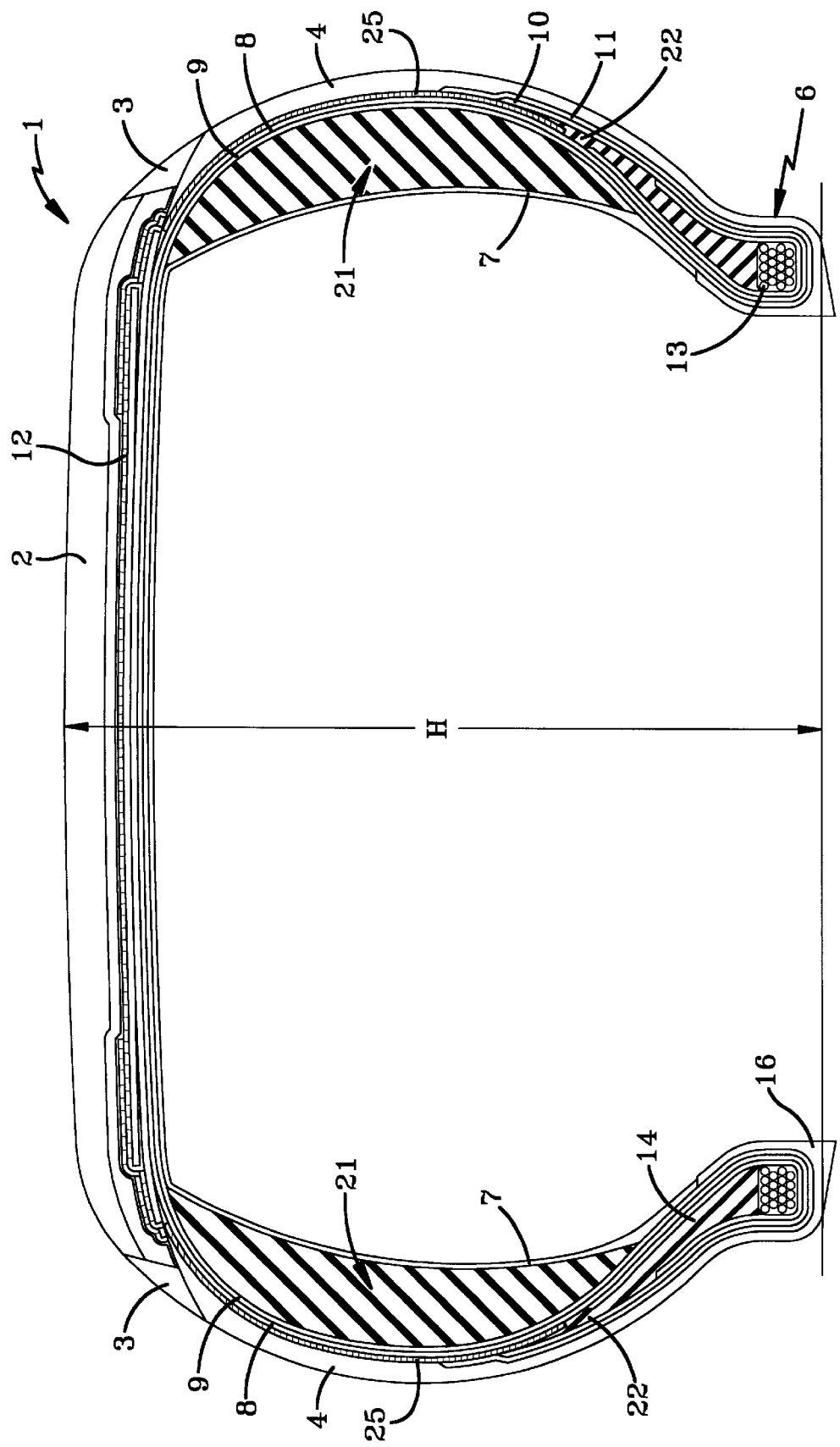
FIG. 2 is a sectional view of the pneumatic tire of a prior art run-flat tire.

On the other hand, a prior art tire having the construction shown in FIG. 2 was obtained for comparison purpose. The carcass plies and belts are substantially the same as those in the tire of the present invention. The bead filler has a height of 37% of the tire section height SH. The crescent-shaped sidewall insert has a inner end set at 57% of a height H of the bead filler and a outer end ending below the belt end. The blend formulation of the compound of the crescent-shaped sidewall insert in the comparative tire is shown in Table 2. Regarding physical properties of the rubber compounds of this invention, a normalized, mechanical static modules of the sulfur-vulcanizable rubber compound is 1500 psi at 15% strain subsequent to vulcanization, the hardness range is 85 on Shore A hardness scale, at 23° C., and the tan δ when measured at 100°C. at 10 Hz and 7 percent deflection is 0.074

| COMPONENT | TABLE 1 | TABLE 2 |
|---|---|---|
| Natural Rubber | 25 | 25 |
| Zn(Ma)2PBd * | 35 | — |
| Polybutadiene (ungrafted) | 40 | 40 |
| SBR (styrene-butadiene rubber) | — | 35 |
| FEF Carbon Black (Conventional Rubber Additive) | 50 | 50 |
| Other Conventional Rubber Additives | 23.5 | 22.1 |
| Shore A Hardness @ 23° C. | 81 | 85 |
| Modulus @ 15% Strain | 2400 | 1500 |
| Tan δ @ 100° C., 10 Hz and 7% deflection | .074 | .067 |

* contains 67% polyybutadiene and 33% zinc methacrylate

The tire of the present invention was tested against the prior art tire of FIG. 2. The results are given below. The test results are given as normalized values based on a reference value of 100 for the prior art tire.

| TEST PARAMETERS | |
|---|---|
| Tire Size | P225/60R16 |
| Inflation | "0" psi, valve core removed |
| Load: | 1270 lbs. |
| Speed | 55 mph constant |
| Steering | Straight ahead |
| Duration | To tire failure (excessive vibration) |

| TEST RESULTS | | |
|---|---|---|
| | INVENTION | PRIOR ART |
| Uninflated Durability | 300+ | 100 |
| Subjective Ride Quality | 150 | 100 |

As explained above in detail, the pneumatic tire according to the present invention has excellent handling and performance characteristics in both inflated and uninflated conditions. The tire of the present invention ran to a distance in excess of 50 mph before failure occurred, as determined by excess vibration, while the prior art tire of FIG. 2 failed at about 15 miles.

The invention in its broader aspects is not limited to the specific embodiments shown and described. Departures may be made therefrom without departing from the principles of the invention and without sacrificing its chief advantages.

What is claimed is:

1. A pneumatic tire having an aspect ratio of greater than 50% comprising:
    a tread portion (10) having a pair of lateral tread edges (20);
    a belt package (30) located radially inward of the tread portion;
    a pair of bead portions (40) each having a bead core (50) and a bead filler (90) positioned radially outward of the bead core, wherein a height H of bead portion (40) from a nominal rim diameter (42) is not less than 30% of a tire section height SH therefrom;
    a carcass structure (70) having at least one carcass ply extending between each bead core (50), at least one ply turned-up around the bead cores in an axially outward direction;
    a pair of sidewalls (60), each extending radially from the lateral tread edge (20) of the tread portion to the bead portion (40), and
    a pair of crescent shaped sidewall inserts (80), one on each side of the belt package, disposed axially inward of the carcass structure, wherein each sidewall insert has a first inner end (82) located from the nominal rim diameter at a position between 15% and 45% of height H of the bead portions, and a second outer end which extends to an axial position of not less than 40% of a half width B/2 of the outermost belt in the belt package, as measured from the lateral edge of the belt toward an equatorial plane EP of the tire.

2. A pneumatic tire having an aspect ratio of greater than 50% comprising:
    a tread portion (10) having a pair of lateral tread edges (20);
    a belt package (30) located radially inward of the tread portion;
    a pair of bead portions (40) each having a bead core (50) and a bead filler (90) positioned radially outward of the bead core, wherein a height H of bead portion (40) from a nominal rim diameter (42) is not less than 30% of a tire section height SH therefrom and is no greater than a height MH therefrom of a maximum section width WM;
    a carcass structure (70) having at least one carcass ply extending between each bead core (50), at least one ply turned-up around the bead cores in an axially outward direction;
    a pair of sidewalls (60), each extending radially from the lateral tread edge (20) of the tread portion to the bead portion (40), and
    a pair of crescent shaped sidewall inserts (80), one on each side of the belt package, disposed axially inward of the carcass structure, wherein each sidewall insert has a first inner end (82) located from the nominal rim diameter at a position between 15% and 45% of height H of the bead portions, and a second outer end which extends to an axial position of not less than 40% of a half width B/2 of the outermost belt in the belt package, as measured from the lateral edge of the belt toward an equatorial plane EP of the tire.

3. The pneumatic tire of claim 2 wherein each sidewall insert below the lateral edge of the outermost belt has a gauge G of from 5 mm to 20 mm.

4. The pneumatic tire of claim 2 wherein each sidewall insert below the lateral edge of the outermost belt has a gauge G of from 6 mm to 13 mm.

5. The pneumatic tire of claim 2 wherein at least one of said at least one carcass ply turned up around the bead cores in an axially outward direction ends above the upper end of the bead fillers.

6. The pneumatic tire of claim 5 wherein the carcass structure is comprised of an inner ply and an outer ply, and wherein the outer ply ends above the upper end of the bead fillers, and the inner ply ends above the end of the outer ply.

7. The pneumatic tire of claim 6 wherein the turn-up portion of the outer ply ends below the maximum section width WM of the tire, and the turnup portion of the inner ply ends above the maximum section width WM of the tire.

8. The pneumatic tire of claim 6 wherein the inner and outer ply are reinforced with organic fiber cords arranged at an angle of 85° to 95° (+85° to −85°) with respect to the equatorial plane of the tire.

9. The pneumatic tire of claim 2 wherein the belt package is comprised of at least two belts reinforced with inextensible cords, the cords in each belt being inclined with respect to each other and inclined at an angle of 18° to 30° with respect to the equatorial plane of the tire.

10. The pneumatic tire of claim 2 wherein the first inner end of each sidewall insert is positioned between 30% and 40% of height H of the bead portions.

11. The pneumatic tire of claim 2 wherein the second outer end of each sidewall insert is positioned not less than 45% of the half width B/2 of the outermost belt.

12. The pneumatic tire of claim 2 wherein each bead portion has a height H of not less than 35% of the tire section height SH.

13. The pneumatic tire of claim 12 wherein each bead portion has a height H of about 37% of the tire section height SH.

14. The pneumatic tire of claim 2 wherein each sidewall insert is comprised of a sulfur-vulcanizable rubber compound having high compressive flex fatigue, high modulus and low hysterisis subsequent to vulcanization.

15. The pneumatic tire of claim 14 wherein the sulfur-vulcanizable rubber compound is characterized by a mechanical static modulus in the range of about 1400–4000 psi at 15% strain subsequent to vulcanization.

16. The pneumatic tire of claim 15 wherein the sulfur-vulcanizable rubber compound is characterized by a mechanical static modulus in the range of about 2600–2800 psi at 15% strain subsequent to vulcanization.

17. The pneumatic tire of claim 14 wherein the sulfur-vulcanizable rubber compound is characterized by a hardness in the range of about 72 to 97 Shore hardness A at 23° C. after vulcanization.

18. The pneumatic tire of claim 17 wherein the sulfur-vulcanizable rubber compound is characterized by a hardness in the range of about 72 to 90 Shore hardness A at 23° C. after vulcanization.

19. The pneumatic tire of claim 14 wherein the sulfur-vulcanizable rubber compound is an uncured rubber composition comprised of:

from about 25 to 75 parts by weight of a rubbery polymer selected from the group consisting of natural rubber and diene polymers or copolymers;

from about 25 to 75 parts by weight, of a graft copolymer comprising an unsaturated polymer backbone selected from the group consisting of polyisoprene, diene polymers or copolymers and a terpolymer of ethylene, propylene and a diene monomer (EPDM), having pendently grafted thereto to a polymerized metal salt of an unsaturated carboxylic acid, and wherein the total weight of the rubbery polymer and the graft copolymer is 100 parts by weight;

about 50 to 100 parts by weight of conventional rubber additives per 100 parts by combined weight of the rubbery polymer and the graft copolymer;

wherein the sulfur-vulcanizable rubber compound is devoid of peroxide components; and wherein the rubber compound is characterized by high compressive flex fatigue, high modulus and low hysterisis, capable of being worked prior to vulcanization, and having high modulus, low hysterisis properties subsequent to vulcanization.

20. The pneumatic tire of claim 19 wherein the graft copolymer is comprised of:

from about 60–80%, by weight, of at least one polymer selected from the group consisting of polyisoprene and diene polymers or copolymers, and from about 20–40%, by weight, of polymerized metal salt of an a,b-ethylenically unsaturated carboxylic acid.

21. The pneumatic tire of claim 19 wherein the polymerized metal salt is poly-zinc dimethacrylate and one of the conventional rubber additives is carbon black.

* * * * *